Patented May 1, 1923.

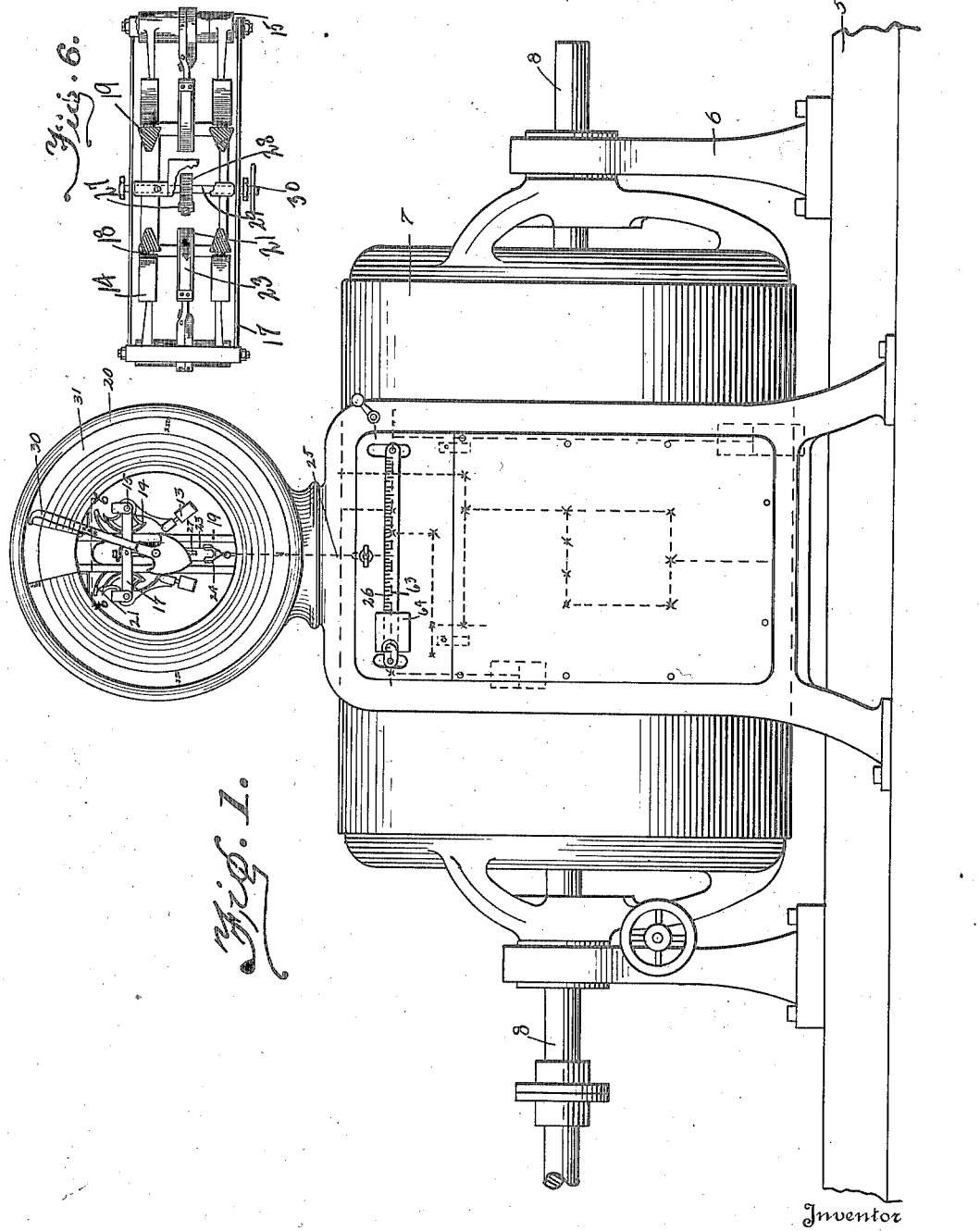

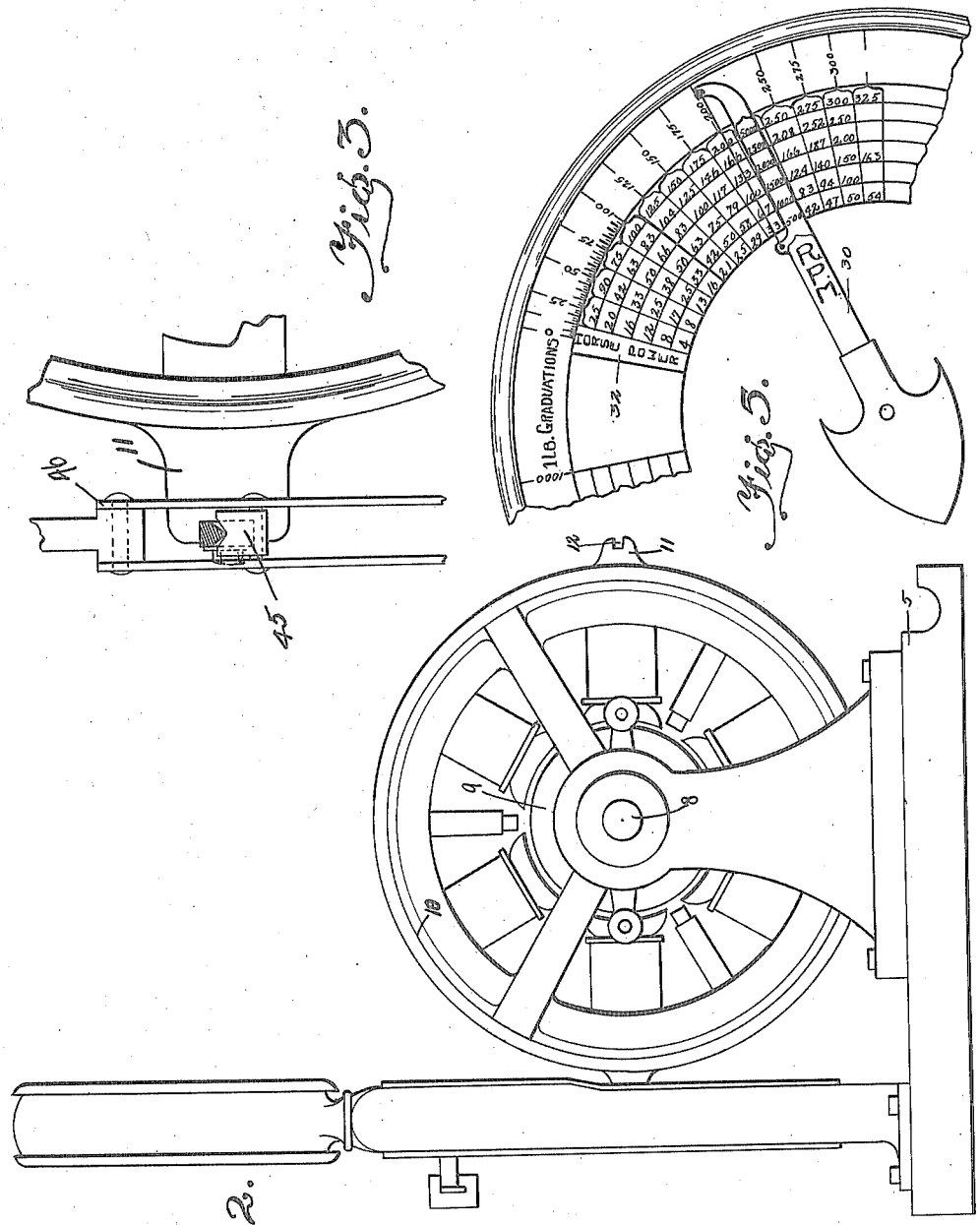

1,453,354

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

DYNAMOMETER.

Application filed August 15, 1918. Serial No. 249,969.

*To all whom it may concern:*

Be it known that I, HALVOR O. HEM, a citizen of the United States, residing at Toledo, in the county of Lucas and State of Ohio, have invented certain new and useful Improvements in Dynamometers, of which the following is a specification.

This invention relates to dynamometers, and more particularly to indicating attachments to the torque resisting elements of dynamometers to automatically indicate the force exerted by an engine, motor or the like to aid in determining the horse power thereof.

Among the objects of the invention are the provision of an indicating attachment in dynamometers having pendulum controlling means for counterbalancing the torque transmitted through the torque resisting elements of the dynamometer; the connection of such pendulum controlling means to the torque resisting elements so as to permit rotation of the torque producing elements in either direction; the arrangement of suitable damping means to prevent the transmission of sudden strains from the torque resisting elements to the indicating mechanism; and the arrangement of a chart adjacent the indicating hand to directly translate the force exerted by the engine into horse power.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a front elevation of a dynamometer embodying my invention;

Figure 2 is a side elevation thereof;

Figure 3 is a detail section taken substantially on the line 3—3 of Figure 4;

Figure 5 is an enlarged detail view of a portion of the chart; and

Figure 6 is a detail plan view taken substantially on the line 6—6 of Figure 5, with portions broken away.

Figure 4:
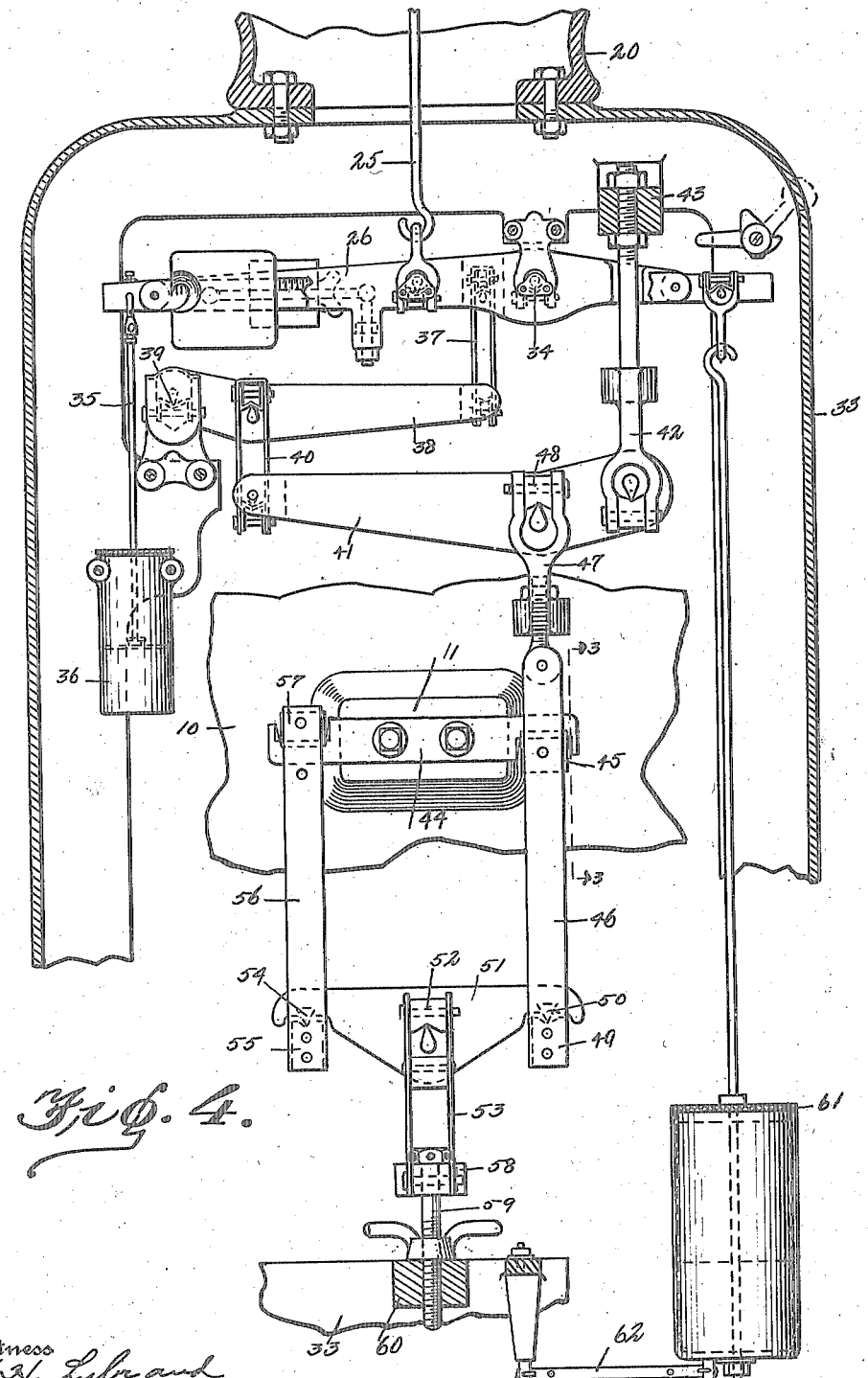
Figure 4 is an enlarged detail view showing the arrangement of the torque producing element and the pendulum controlling means.

Referring to the drawings, the numeral 5 designates a base carrying standards 6 for supporting the torque resisting element 7, the shaft 8 of which is journalled in suitable bearings carried by the standards. The torque resisting element herein shown is chosen merely for the purpose of exemplification and comprises a well-known type of electric torque resisting member having an armature 9 suitably secured to the shaft 8 and a rotatable field 10 so mounted as to be free to rotate about the same shaft in conformity with the magnetic pull exerted by the armature in its rotation. The engine, motor or the like to be tested is coupled to the shaft 8 in any desired manner and directly rotates the armature. The rotatable field 10 carries diametrically opposed projecting lugs 11 which are suitably slotted, as at 12, for connection with the lever mechanism of the indicating mechanism. As herein shown, one only of these lugs is attached to the indicating attachment (see Figure 2).

The indicating attachment is herein shown as comprising a pair of oppositely-disposed pendulums 13 (see Figures 1 and 6) each of which comprises supporting segments 14 secured upon transverse shafts 15 and the two shafts are connected together by crossbars 17, the segments 14 being suspended from the lower ends of flexible ribbons 18 secured at their upper ends upon the supporting framework 19 suitably secured within the housing 20. Intermediate the supporting segments of each pendulum is a larger segment 21 which is also fixed to the transverse shaft 15, said segment extending at its periphery between the pillars of the supporting frame and is connected at its upper end, as at 22, to a flexible metallic ribbon 23 which extends over the arcuate face of the segment and is attached at its lower end to an equalizer bar 24. The construction of the two pendulums is substantially identical and the ribbons 23 are connected to opposite sides of the equalizer bar 24, as shown in Figure 1, which is pivotally connected, as by the link 25, with the main lever 26 (see Figure 4) which in turn is connected through suitable intermediate levers with the projecting lug 11 on the torque resisting member, the construction and arrangement being such that whenever the projecting lug 11 is vertically moved a downward pull will be exerted upon the equalizer bar 24 which is transmitted through the ribbons 23 to the larger segments 21, causing the swinging of the pendulums so that the pendulum weights thereon are raised to a position counterbalancing the torque transmitted by the projecting lug 11. During the swinging movement of the pendulums to counterbalance the torque, the crossbars 17 are moved vertically upward and through the medium of this vertical movement of the cross-bars the indication on a suitable chart is effected, the cross-bar 17 carrying a vertically-disposed rack 27 meshing with a pinion 28 fixed upon the indicator shaft 29 carrying the indicator hand 30. The indicator shaft is mounted concentrically of the dial 31 having graduations in pounds or other suitable weight units inscribed thereon, with which graduations the indicator hand 30 is adapted to co-act in indicating in terms of weight the force exerted by the engine or motor being tested. This dial 31 is suitably fixed within the housing 20 and carries a chart 32 inscribed to directly translate into units of horse power the force shown by the indicating hand 30 and dial 31. As shown in Figure 5, this chart may be arranged with concentric rows of indications corresponding to the horse power units exerted at various revolutions per minute of the engine or motor being tested. The rate of revolutions per minute is inscribed on the indicator hand 30 at a point concentric with the row of indications marked on the chart.

The casing 20 is suitably supported upon a casing 33 mounted adjacent the base 5 and carries bearings 34 (see Figure 4) supporting the fulcrum pivots of the main lever 26, which as hereinbefore mentioned is connected by the link 25 with the pendulum controlling mechanism. The main lever 26 is connected adjacent one extremity with the plunger 35 of a dash pot 36 or other suitable damping means whereby the transmission of sudden strains and shocks from the torque resisting elements is absorbed, permitting the working of the indicating mechanism without undue vibration. Intermediate the fulcrum pivot and the connection to the link 25 the main lever 26 is connected with suitable intermediate levers in turn connected with the projecting lug 11 of the torque resisting element. As herein shown, a link 37 connects the main lever 26 with the upper shelf lever 38 fulcrumed as at 39 upon bearings carried by the casing 33 and connected through the link 40 with the lower shelf lever 41 fulcrumed upon bearings carried by a bracket 42 adjustably mounted in a crossbar 43 of the casing. The lower shelf lever 41 is connected with the projecting lug 11 of the torque resisting element through a reversible transmission frame whereby a downward pull is exerted on the shelf lever 41 regardless of whether the lug 11 is swung upwardly or downwardly. This frame preferably comprises a crossbar 44 suitably secured in the slot of the lug 11 and having a downwardly extending knife edge pivot adjacent one extremity and an upwardly extending knife edge pivot adjacent its opposite extremity (see Figure 4). The downwardly extending pivot of the crossbar 44 normally rests in a bearing 45 carried by the vertically-disposed link 46 which at its upper extremity is adjustably connected with a yoke member 47 carrying bearings 48 resting on a pivot carried by the shelf lever 41. Adjacent its lower extremity this link 46 carries a bearing 49 arranged to receive a pivot 50 of the equal-armed lever 51 fulcrumed intermediate its ends upon a bearing 52 carried at the upper extremity of the link 53. At its other extremity the lever 51 carries a pivot 54 resting in a bearing 55 carried adjacent the lower extremity of the upright link 56, which link also carries adjacent its upper extremity a bearing 57 normally resting upon the upwardly-extending knife edge of the crossbar 44. The link 53 carries at its lower extremity an apertured plate 58 loosely surrounding the bolt 59 mounted in a lug 60 of the casing 33.

Whenever the engine to be tested is so connected with the torque resisting element that the lug 11 connected with the indicating attachment is swung downwardly from its normal position, this torque is transmitted to the lower shelf lever 41 and the indicating attachment directly through the crossbar 44 and the link 46, since the downwardly-extending knife edge of the crossbar 44 normally rests on the bearing 45 carried by the link 46. As the crossbar 44 and link 46 descend, the lever 51 and links 53 and 56 idly descend, the apertured plate 58 freely falling upon the bolt 59. When, on the other hand, the engine to be tested is so connected with the torque resisting element that the projecting lug 11 connected with the indicating attachment is swung upwardly from its normal position, the crossbar 44 moves away from the bearing 45 and the link 46, but in so doing carries upwardly the link 56 through which the arm of the lever 51 connected with the link 56 is elevated and the opposite arm of the lever 51 is swung downwardly a corresponding distance (the lever 51 being an equal-armed lever). This downward movement of the arm of the lever 51 connected with the link 46 serves to exert a pull upon the lower shelf lever 41 and the indicating attachment corresponding to the torque transmitted through the lug 11.

The pendulum controlling means of the indicating attachment and its intermediate levers may be floated through a depending weight 61 carried by the main lever 26, substantially as shown in Figure 4, a suitable link 62 being provided to insure vertical movement of this weight.

If desired, a graduated beam 63 and slidable poise 64 may be mounted on the main lever 26 to increase the counter-balancing capacity of the indicating attachment.

The operation of my improved dynamometer is believed to be apparent from the foregoing description. The engine, motor or the like to be tested is suitably connected with the shaft 8 of the torque resisting element and when the engine is running the armature of the torque resisting member is rotated, creating a tendency for the rotatable field to revolve therewith against the resistance offered by the pendulum counterbalancing mechanism. The torque so produced is transmitted from the rotatable field through the projecting lug 11 and intermediate levers to the pendulums 13, elevating the pendulums through a sufficient arc to offset the torque produced. The indicating hand 30 is rotated from the pendulums through a suitable arc to indicate on the dial 31 the force transmitted in terms of weight units, and this force in terms of horse power units may also be directly read upon the chart 32.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the subjoined claims.

Having described my invention, I claim:

1. In a dynamometer, a torque resisting element, an indicating attachment employing a dial, an indicating hand swinging thereover, a pendulum arranged to counterbalance the force exerted by the machine to be tested, a main lever connected with the pendulum, a graduated beam and poise mounted on said lever, and a series of interconnected levers arranged between the main lever and the torque resisting element.

2. In a dynamometer, an indicating attachment employing a dial, an indicating hand swinging thereover, a pendulum arranged to counterbalance the force exerted by the machine to be tested, a main lever connected with the pendulum, a series of levers connected with the main lever, a torque resisting element and a reversing frame mechanism connected with the torque resisting element and the lower lever of said series to impart a downward pull on said lower lever regardless of the direction of rotation of the torque resisting element.

3. In a dynamometer, the combination of an electric torque resisting element, a pendulum connected therewith to counterbalance the force exerted by the machine to be tested, a vibration damping device connected to said pendulum and connections from the pendulum to indicate the amount of such force.

4. In a dynamometer, the combination of an electric torque resisting element arranged to be connected with the machine to be tested, and an indicating attachment connected with said element and comprising a pendulum counterbalance for the force exerted by the scale to be tested, and connections from the pendulum to indicate the amount of such force.

5. In a dynamometer, the combination of an electric torque resisting element arranged to be connected with the machine to be tested, and an indicating attachment connected with said element and comprising a dial, an indicating hand swinging thereover, a pendulum arranged to counterbalance the force exerted by the machine to be tested, and connections from the pendulum to the indicator hand.

6. In a dynamometer, the combination of an electric torque resisting element arranged to be connected with the machine to be tested, and an indicating attachment connected with said element and comprising a dial, an indicating hand swinging thereover, a plurality of pendulums arranged to counterbalance the force exerted by the machine to be tested, and connections from the pendulums to the indicator hand.

7. In a dynamometer, the combination of an electric torque resisting element arranged to be connected with the machine to be tested, and an indicating attachment connected with said element and comprising a dial, an indicating hand swinging thereover, a plurality of pendulums arranged to counterbalance the force exerted by the machine to be tested, a plurality of interconnected levers arranged between the pendulums and said element, and connections from the pendulums to the indicator hand.

8. In a dynamometer, the combination of an electric torque resisting element arranged to be connected with the machine to be tested, and an indicating attachment connected with said element and comprising a dial, an indicating hand swinging thereover, a plurality of pendulums arranged to counterbalance the force exerted by the machine to be tested, a main lever connected with the pendulums, a plurality of interconnected levers arranged between the main lever and said element, and connections from the pendulums to the indicator hand.

9. In a dynamometer, the combination of an electric torque resisting element arranged to be connected with the machine to be testeded, and an indicating attachment connected with said element and comprising a dial, an indicating hand swinging thereover, a plurality of pendulums arranged to counterbalance the force exerted by the machine to be tested, a main lever connected with the pendulums, a graduated beam and poise carried by said lever, a plurality of interconnected levers arranged between the main beam and said element, and connections from the pendulums to the indicator hand.

10. In a dynamometer, the combination of an electric torque resisting element, and an indicating attachment connected therewith to show the force exerted by the machine to be tested and comprising a pendulum counterbalance, connections between said pendulum counterbalance and said element, and a dash pot secured to said connections in position to prevent the transmission of shocks from said element to the pendulum counterbalance.

11. In a dynamometer, the combination of an electric torque resisting element, and an indicating attachment connected therewith to show the force exerted by the machine to be tested and comprising a pendulum counterbalance, a series of interconnected levers arranged between the pendulum and said element, and a dash pot connected with one of said levers and arranged to prevent the transmission of shocks from said element to the pendulum counterbalance.

12. In a dynamometer, an indicating attachment including a dial and an index hand arranged to co-operate therewith, said dial bearing a chart having a plurality of concentric rows of graduations, the outermost of said rows showing the force in terms of weight of the machine being tested and the inner rows showing directly in horse power the force exerted by said machine at various revolutions per minute, the index hand bearing indications distinguishing the several rows by the number of revolutions per minute at which they are computed.

13. In a dynamometer, an element tending to partake of the motion of a machine to be tested and when restrained by force, resisting the movement of such machine with a force proportional to such restraining force, and a pendulum holding said element against movement.

HALVOR O. HEM.

Witnesses:
GEORGE R. FRYE,
FRANCES C. DOYLE.